US009453928B2

(12) United States Patent
Szydlik et al.

(10) Patent No.: US 9,453,928 B2
(45) Date of Patent: Sep. 27, 2016

(54) METHODS AND COMPUTING SYSTEMS FOR PROCESSING DATA

(71) Applicant: WESTERNGECO L.L.C., Houston, TX (US)

(72) Inventors: Bartosz Szydlik, Tananger (NO); Ian Moore, Mosman Park (AU)

(73) Assignee: WESTERNGECO L.L.C., Houston, TX (US)

( * ) Notice: Subject to any disclaimer, the term of this patent is extended or adjusted under 35 U.S.C. 154(b) by 684 days.

(21) Appl. No.: 13/723,125

(22) Filed: Dec. 20, 2012

(65) Prior Publication Data

US 2013/0235697 A1    Sep. 12, 2013

Related U.S. Application Data

(60) Provisional application No. 61/607,187, filed on Mar. 6, 2012.

(51) Int. Cl.
*G01V 1/28* (2006.01)
*G01V 1/00* (2006.01)
*G01V 1/36* (2006.01)

(52) U.S. Cl.
CPC .............. *G01V 1/282* (2013.01); *G01V 1/005* (2013.01); *G01V 1/28* (2013.01); *G01V 1/364* (2013.01); *G01V 2210/614* (2013.01)

(58) Field of Classification Search
CPC .......... G01V 1/28; G01V 1/38; G01V 1/282; G01V 2210/614
USPC ............................................. 367/38, 73, 21
See application file for complete search history.

(56) References Cited

U.S. PATENT DOCUMENTS

| 5,424,999 A | 6/1995 | Manin |
| 5,717,655 A | 2/1998 | Beasley |
| 5,719,821 A | 2/1998 | Sallas et al. |
| 5,924,049 A | 7/1999 | Beasley et al. |

(Continued)

FOREIGN PATENT DOCUMENTS

| EP | 2138868 | 12/2009 |
| WO | 2010019957 A1 | 2/2010 |

(Continued)

OTHER PUBLICATIONS

International Search Report and Written Opinion of PCT Application No. PCT/US2013/029228 dated Jun. 24, 2013: pp. 1-9.

(Continued)

*Primary Examiner* — Ian J Lobo
(74) *Attorney, Agent, or Firm* — Abimbola Bukoye

(57) ABSTRACT

Computing systems and methods for processing collected data are disclosed. In one embodiment, a method for iteratively separating a simultaneous-source dataset is provided, wherein the simultaneous-source dataset is used as an input dataset for a first iteration of simultaneous-source separation. The input dataset includes a plurality of shots that include data corresponding to a plurality of source activations. The method of iteratively separating the input dataset includes generating simulated simultaneous shots based on shots separated in the input dataset; and forming an output dataset based on the separated simultaneous shots and the simultaneous-source dataset, wherein the output dataset is configured for use as the input dataset for the next iteration of separating the simultaneous-source dataset.

20 Claims, 6 Drawing Sheets

(56) References Cited

U.S. PATENT DOCUMENTS

| | | | |
|---|---|---|---|
| 5,973,995 | A | 10/1999 | Walker et al. |
| 6,545,944 | B2 | 4/2003 | de Kok |
| 6,687,619 | B2 | 2/2004 | Moerig et al. |
| 6,754,590 | B1 | 6/2004 | Moldoveanu |
| 6,865,488 | B2 | 3/2005 | Moerig et al. |
| 6,882,938 | B2 | 4/2005 | Vaage et al. |
| 6,906,981 | B2 | 6/2005 | Vaage |
| 7,440,357 | B2 | 10/2008 | Hopperstad |
| 7,599,798 | B2 | 10/2009 | Beasley et al. |
| 7,859,945 | B2 | 12/2010 | Sallas et al. |
| 7,916,576 | B2 | 3/2011 | Beasley et al. |
| 7,948,825 | B2 | 5/2011 | Moldoveanu |
| 8,121,823 | B2 | 2/2012 | Krebs et al. |
| 8,174,928 | B2 | 5/2012 | Beasley |
| 8,218,393 | B2 | 7/2012 | Beasley |
| 8,248,886 | B2 | 8/2012 | Neelamani et al. |
| 8,295,124 | B2 | 10/2012 | Abma |
| 2005/0024990 | A1 | 2/2005 | Laake |
| 2006/0164916 | A1 | 7/2006 | Krohn et al. |
| 2009/0073805 | A1 | 3/2009 | Tulett et al. |
| 2009/0168600 | A1 | 7/2009 | Moore et al. |
| 2009/0326895 | A1 | 12/2009 | Beasley |
| 2010/0018718 | A1 | 1/2010 | Krebs et al. |
| 2010/0039894 | A1 | 2/2010 | Abma |
| 2010/0085836 | A1 | 4/2010 | Bagaini et al. |
| 2010/0097885 | A1 | 4/2010 | Moore |
| 2010/0097888 | A1 | 4/2010 | Neelamani et al. |
| 2010/0254220 | A1 | 10/2010 | Tulett et al. |
| 2010/0271904 | A1 | 10/2010 | Moore et al. |
| 2011/0000678 | A1 | 1/2011 | Krebs et al. |
| 2011/0096625 | A1 | 4/2011 | Rentsch et al. |
| 2011/0141848 | A1 | 6/2011 | Beasley et al. |
| 2011/0158044 | A1 | 6/2011 | Moldoveanu et al. |
| 2011/0182142 | A1 | 7/2011 | Liu et al. |
| 2011/0194378 | A1 | 8/2011 | Decker et al. |
| 2011/0214422 | A1 | 9/2011 | VanDyne et al. |
| 2012/0008459 | A1 | 1/2012 | Coste et al. |
| 2012/0039149 | A1 | 2/2012 | van Borselen et al. |
| 2012/0073824 | A1 | 3/2012 | Routh et al. |
| 2012/0073825 | A1* | 3/2012 | Routh et al. ............... 166/369 |
| 2012/0075955 | A1 | 3/2012 | Dean |
| 2012/0081998 | A1 | 4/2012 | Almaas et al. |
| 2012/0109612 | A1 | 5/2012 | Krebs et al. |
| 2012/0143506 | A1 | 6/2012 | Routh et al. |
| 2012/0147699 | A1 | 6/2012 | Dellinger et al. |
| 2012/0147701 | A1 | 6/2012 | Ross et al. |
| 2012/0155218 | A1 | 6/2012 | Beasley et al. |
| 2012/0176861 | A1 | 7/2012 | Abma et al. |
| 2012/0269034 | A1 | 10/2012 | Neelamani et al. |
| 2012/0275266 | A1 | 11/2012 | Eick et al. |

FOREIGN PATENT DOCUMENTS

| | | |
|---|---|---|
| WO | 2010053769 A2 | 5/2010 |
| WO | 2012018622 A1 | 2/2012 |
| WO | WO 2013134329 A1 * | 9/2013 |

OTHER PUBLICATIONS

European Search Report issued in related EP application No. 13756989.3 on Nov. 17, 2015, 5 pages.

Office Action issued in related EP application No. 13756989.3 on Dec. 1, 2015, 4 pages.

Examination Report issued in related AU application No. 2013230059 on Oct. 22, 2015, 2 pages.

Office Action issued in related MX application No. MX/a/2014/010599 mailed on Dec. 15, 2015, 4 pages.

International Preliminary Report on Patentability issued in related international application PCT/US2013/029228 mailed Sep. 18, 2014, 6 pages.

* cited by examiner

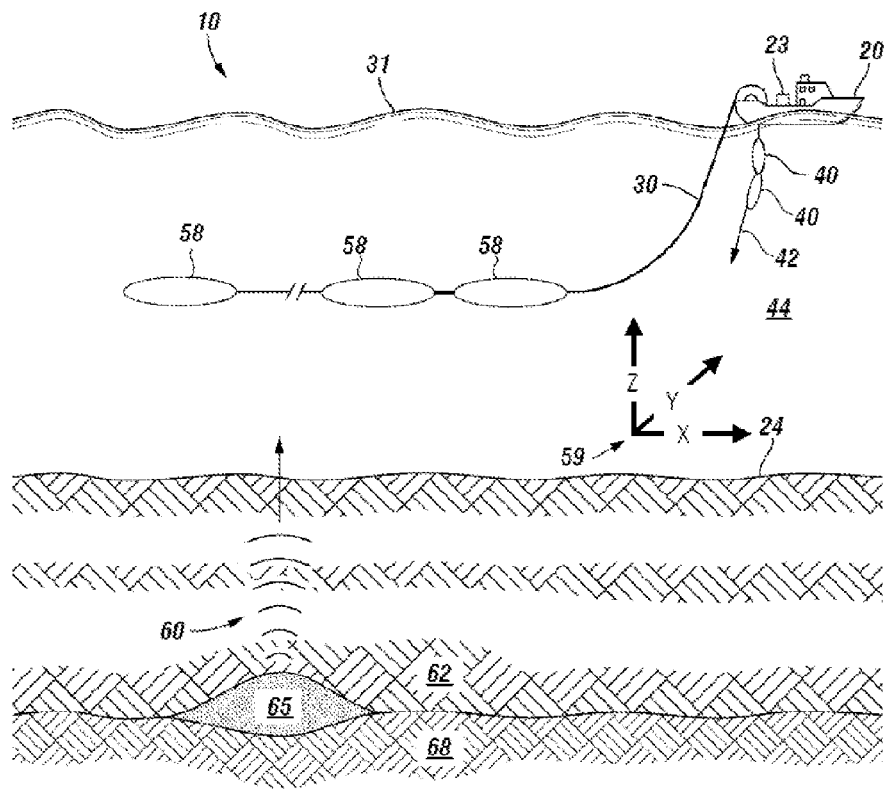

| Obtain seismic data vector $d$, which was acquired by seismic sensors due to simultaneous or near simultaneous firings of $N$ seismic sources. | 114 |

| Associate models that describe geology associated with energy produced by the seismic sources with linear operators that describe the physics of the source mechanisms, the wave propagation, and the survey geometry. | 118 |

| Characterize seismic data vector $d$ as a function of models and/or linear operators. | 122 |

| Jointly invert function for models. | 126 |

| Separate seismic data vector $d$ into seismic data vectors $d_1 \ldots d_N$, with each vector being attributable to one of the $N$ seismic sources. | 130 |

502 — Receive an input dataset that corresponds at least in part to a subsurface three-dimensional geologic formation, wherein the input dataset is a simultaneous-source acquired dataset that includes a plurality of shots, and one or more shots in the plurality of shots includes data corresponding to a plurality of source activations.

504 — The plurality of source activations includes a plurality of successive activations of a first source.

506 — The plurality of source activations includes one or more activations of respective sources in a plurality of sources.

508 — Separate the input dataset into a plurality of separated shots, wherein respective shots in the plurality of separated shots correspond to respective shots in the plurality of shots in the input dataset.

510 — Determine a residual that is added to the plurality of separated shots.

512 — Parameterize the input dataset to reduce leakage.

514 — Use sparse inversion to separate the input dataset.

516 — Use random noise attenuation to separate the input dataset.

| 602 | Iteratively separate a simultaneous-source dataset that is used as an input dataset for a first iteration of simultaneous-source separation, wherein the simultaneous-source dataset corresponds at least in part to a subsurface three-dimensional geologic formation, and includes a plurality of shots where one or more shots in the plurality of shots includes data corresponding to a plurality of source activations; and wherein the method of iteratively separating the input dataset includes generating a plurality of separated shots from the input dataset. |

↓

Generate a plurality of simulated simultaneous shots based at least in part on the plurality of separated shots. — 604

The plurality of the simulated simultaneous shots is generated according to a first technique during a first iteration and according to a second technique during a second iteration. — 606

Interpolate respective separated shots in the plurality of separated shots, wherein the interpolation is based at least in part on an interpolation factor. — 608

The interpolation factor is altered between a first separation iteration and a second separation iteration. — 610

↓

Form an output dataset based at least in part on the plurality of separated simultaneous shots and the simultaneous-source dataset, wherein the output dataset is configured for use as the input dataset for the next iteration of separating the simultaneous-source dataset. — 612

Interleave the plurality of separated simulated shots with the simultaneous-source dataset. — 614

Figure 6

METHODS AND COMPUTING SYSTEMS FOR PROCESSING DATA

CROSS-REFERENCE TO RELATED APPLICATION

This application claims the benefit of U.S. Provisional Patent Application Ser. No. 61/607,187 filed Mar. 6, 2012, which is incorporated herein by reference in its entirety.

BACKGROUND

Simultaneous-source acquisition involves recording two or more seismic shots over the same time interval. This increases acquisition efficiency, but in many circumstances, the recorded signals attributable to individual sources need to be separated in order to enable further data processing. Separation techniques are generally implemented in a domain containing data from many shots in order to take advantage of dithering. However, this means that the sampling is dependent on the shot interval, which is often large enough to cause problems due to spatial aliasing. Use of sparse inversion overcomes this to some extent, but the technique is still problematic if the shot interval is too large.

Conventional data (i.e., shots fired sequentially) with an undesirably-large shot interval are typically processed by interpolating shots between the acquired ones. Unfortunately, unseparated simultaneous-source data cannot be interpolated using algorithms designed for conventional data because the timing differences between shots for multiple sources (also sometimes referred to as a "dither") create incoherency from shot to shot for at least one of the sources.

Accordingly, there is a need for methods and systems that can employ more effective and accurate methods for data processing of collected data that corresponds to a subsurface region, including techniques that allow separation of collected data, including simultaneous-source acquired data.

SUMMARY

The above deficiencies and other problems associated with processing of collected data are reduced or eliminated by the disclosed methods and devices.

In accordance with some embodiments, a method is performed that includes receiving an input dataset that corresponds at least in part to a subsurface three-dimensional geologic formation, wherein: the input dataset is a simultaneous-source acquired dataset that includes a plurality of shots, and one or more shots in the plurality of shots includes data corresponding to a plurality of source activations; separating the input dataset into a plurality of separated shots, wherein respective shots in the plurality of separated shots correspond to respective shots in the plurality of shots in the input dataset; for one or more separated shots in the plurality of separated shots: interpolating respective separated shots to form respective interpolated shots, and encoding the respective interpolated shots to form respective simulated simultaneous shots; forming a hybrid simultaneous-source dataset based at least in part on the simulated simultaneous shots and the input dataset; and separating the hybrid simultaneous-source dataset into a second plurality of separated shots, wherein respective shots in the second plurality of separated shots correspond to respective shots in the hybrid simultaneous-source dataset.

In accordance with some embodiments, a computing system is provided that includes at least one processor, at least one memory, and one or more programs stored in the at least one memory, wherein the one or more programs are configured to be executed by the one or more processors, the one or more programs including instructions for receiving an input dataset that corresponds at least in part to a subsurface three-dimensional geologic formation, wherein: the input dataset is a simultaneous-source acquired dataset that includes a plurality of shots, and one or more shots in the plurality of shots includes data corresponding to a plurality of source activations; separating the input dataset into a plurality of separated shots, wherein respective shots in the plurality of separated shots correspond to respective shots in the plurality of shots in the input dataset; for one or more separated shots in the plurality of separated shots: interpolating respective separated shots to form respective interpolated shots, and encoding the respective interpolated shots to form respective simulated simultaneous shots; forming a hybrid simultaneous-source dataset based at least in part on the simulated simultaneous shots and the input dataset; and separating the hybrid simultaneous-source dataset into a second plurality of separated shots, wherein respective shots in the second plurality of separated shots correspond to respective shots in the hybrid simultaneous-source dataset.

In accordance with some embodiments, a non-transitory computer readable storage medium is provided, the medium having a set of one or more programs including instructions that when executed by a computing system cause the computing system to receive an input dataset that corresponds at least in part to a subsurface three-dimensional geologic formation, wherein: the input dataset is a simultaneous-source acquired dataset that includes a plurality of shots, and one or more shots in the plurality of shots includes data corresponding to a plurality of source activations; separate the input dataset into a plurality of separated shots, wherein respective shots in the plurality of separated shots correspond to respective shots in the plurality of shots in the input dataset; for one or more separated shots in the plurality of separated shots: interpolate respective separated shots to form respective interpolated shots, and encode the respective interpolated shots to form respective simulated simultaneous shots; form a hybrid simultaneous-source dataset based at least in part on the simulated simultaneous shots and the input dataset; and separate the hybrid simultaneous-source dataset into a second plurality of separated shots, wherein respective shots in the second plurality of separated shots correspond to respective shots in the hybrid simultaneous-source dataset In accordance with some embodiments, a computing system is provided that includes at least one processor, at least one memory, and one or more programs stored in the at least one memory; and means for receiving an input dataset that corresponds at least in part to a subsurface three-dimensional geologic formation, wherein: the input dataset is a simultaneous-source acquired dataset that includes a plurality of shots, and one or more shots in the plurality of shots includes data corresponding to a plurality of source activations; means for separating the input dataset into a plurality of separated shots, wherein respective shots in the plurality of separated shots correspond to respective shots in the plurality of shots in the input dataset; for one or more separated shots in the plurality of separated shots: means for interpolating respective separated shots to form respective interpolated shots, and means for encoding the respective interpolated shots to form respective simulated simultaneous shots; means for forming a hybrid simultaneous-source dataset based at least in part on the simulated simultaneous shots and the input dataset; and means for separating the hybrid simultaneous-source dataset into a second plurality of separated shots, wherein respective shots in the second plurality of separated shots correspond to respective shots in the hybrid simultaneous-source dataset.

In accordance with some embodiments, an information processing apparatus for use in a computing system is provided, and includes means for receiving an input dataset that corresponds at least in part to a subsurface three-dimensional geologic formation, wherein: the input dataset is a simultaneous-source acquired dataset that includes a plurality of shots, and one or more shots in the plurality of shots includes data corresponding to a plurality of source activations; means for separating the input dataset into a plurality of separated shots, wherein respective shots in the plurality of separated shots correspond to respective shots in the plurality of shots in the input dataset; for one or more separated shots in the plurality of separated shots: means for interpolating respective separated shots to form respective interpolated shots, and means for encoding the respective interpolated shots to form respective simulated simultaneous shots; means for forming a hybrid simultaneous-source dataset based at least in part on the simulated simultaneous shots and the input dataset; and means for separating the hybrid simultaneous-source dataset into a second plurality of separated shots, wherein respective shots in the second plurality of separated shots correspond to respective shots in the hybrid simultaneous-source dataset.

In accordance with some embodiments, a method is performed that includes iteratively separating a simultaneous-source dataset that is used as an input dataset for a first iteration of simultaneous-source separation, wherein the simultaneous-source dataset: corresponds at least in part to a subsurface three-dimensional geologic formation, and includes a plurality of shots, wherein one or more shots in the plurality of shots includes data corresponding to a plurality of source activations; and the method of iteratively separating the input dataset includes: generating a plurality of separated shots from the input dataset; generating a plurality of simulated simultaneous shots based at least in part on the plurality of separated shots; and forming an output dataset based at least in part on the plurality of separated simultaneous shots and the simultaneous-source dataset, wherein the output dataset is configured for use as the input dataset for the next iteration of separating the simultaneous-source dataset.

In accordance with some embodiments, a computing system is provided that includes at least one processor, at least one memory, and one or more programs stored in the at least one memory, wherein the one or more programs are configured to be executed by the one or more processors, the one or more programs including instructions for iteratively separating a simultaneous-source dataset that is used as an input dataset for a first iteration of simultaneous-source separation, wherein the simultaneous-source dataset: corresponds at least in part to a subsurface three-dimensional geologic formation, and includes a plurality of shots, wherein one or more shots in the plurality of shots includes data corresponding to a plurality of source activations; and the method of iteratively separating the input dataset includes: generating a plurality of separated shots from the input dataset; generating a plurality of simulated simultaneous shots based at least in part on the plurality of separated shots; and forming an output dataset based at least in part on the plurality of separated simultaneous shots and the simultaneous-source dataset, wherein the output dataset is configured for use as the input dataset for the next iteration of separating the simultaneous-source dataset.

In accordance with some embodiments, a computer readable storage medium is provided, the medium having a set of one or more programs including instructions that when executed by a computing system cause the computing system to: iteratively separate a simultaneous-source dataset that is used as an input dataset for a first iteration of simultaneous-source separation, wherein the simultaneous-source dataset: corresponds at least in part to a subsurface three-dimensional geologic formation, and includes a plurality of shots, wherein one or more shots in the plurality of shots includes data corresponding to a plurality of source activations; and the method of iteratively separating the input dataset causes the computing system to: generate a plurality of separated shots from the input dataset; generate a plurality of simulated simultaneous shots based at least in part on the plurality of separated shots; and form an output dataset based at least in part on the plurality of separated simultaneous shots and the simultaneous-source dataset, wherein the output dataset is configured for use as the input dataset for the next iteration of separating the simultaneous-source dataset.

In accordance with some embodiments, a computing system is provided that includes at least one processor, at least one memory, and one or more programs stored in the at least one memory; and means for iteratively separating a simultaneous-source dataset that is used as an input dataset for a first iteration of simultaneous-source separation, wherein the simultaneous-source dataset corresponds at least in part to a subsurface three-dimensional geologic formation, and includes a plurality of shots, wherein one or more shots in the plurality of shots includes data corresponding to a plurality of source activations; and the means for iteratively separating the input dataset includes: means for generating a plurality of separated shots from the input dataset; means for generating a plurality of simulated simultaneous shots based at least in part on the plurality of separated shots; and means for forming an output dataset based at least in part on the plurality of separated simultaneous shots and the simultaneous-source dataset, wherein the output dataset is configured for use as the input dataset for the next iteration of separating the simultaneous-source dataset.

In accordance with some embodiments, an information processing apparatus for use in a computing system is provided, and includes means for iteratively separating a simultaneous-source dataset that is used as an input dataset for a first iteration of simultaneous-source separation, wherein the simultaneous-source dataset corresponds at least in part to a subsurface three-dimensional geologic formation, and includes a plurality of shots, wherein one or more shots in the plurality of shots includes data corresponding to a plurality of source activations; and the means for iteratively separating the input dataset includes: means for generating a plurality of separated shots from the input dataset; means for generating a plurality of simulated simultaneous shots based at least in part on the plurality of separated shots; and means for forming an output dataset based at least in part on the plurality of separated simultaneous shots and the simultaneous-source dataset, wherein the output dataset is configured for use as the input dataset for the next iteration of separating the simultaneous-source dataset.

In some embodiments, an aspect of the invention involves dropping one or more of the interpolated shots after separating the hybrid simultaneous-source dataset into the second plurality of separated shots.

In some embodiments, an aspect of the invention includes that forming the hybrid simultaneous-source dataset includes interleaving the simulated simultaneous shots with the plurality of shots in the input dataset.

In some embodiments, an aspect of the invention includes that separating the input dataset into the plurality of separated shots further comprises determining a residual that is added to the plurality of separated shots.

In some embodiments, an aspect of the invention includes that separating the input dataset into the plurality of separated shots further comprises parameterizing the input dataset to reduce leakage.

In some embodiments, an aspect of the invention includes that separating the input dataset into the plurality of separated shots is performed by sparse inversion.

In some embodiments, an aspect of the invention includes that separating the input dataset into the plurality of separated shots is performed by random noise attenuation.

In some embodiments, an aspect of the invention includes that respective simulated simultaneous shots are formed by combining a plurality of separated interpolated shots.

In some embodiments, an aspect of the invention includes that the plurality of source activations includes a plurality of successive activations of a first source.

In some embodiments, an aspect of the invention includes that the plurality of source activations includes one or more activations of respective sources in a plurality of sources.

In some embodiments, an aspect of the invention includes that the interpolated shots are encoded with the same encoding scheme that was used while acquiring the simultaneous-source acquired dataset.

In some embodiments, an aspect of the invention includes that the interpolated shots are encoded with an extended encoding scheme.

In some embodiments, an aspect of the invention includes that the extended coding scheme is not practical for use while acquiring a simultaneous-source acquired dataset.

In some embodiments, an aspect of the invention includes that forming the output dataset includes interleaving the plurality of separated simulated shots with the simultaneous-source dataset.

In some embodiments, an aspect of the invention includes that the plurality of the separated shots is generated according to a first technique during a first iteration and according to a second technique during a second iteration.

In some embodiments, an aspect of the invention includes that the plurality of the simulated simultaneous shots is generated according to a first technique during a first iteration and according to a second technique during a second iteration.

In some embodiments, an aspect of the invention includes that generating the plurality of simulated simultaneous shots includes interpolating respective separated shots in the plurality of separated shots, and the interpolation is based at least in part on an interpolation factor.

In some embodiments, an aspect of the invention includes that the interpolation factor is altered between a first separation iteration and a second separation iteration.

In some embodiments, an aspect of the invention includes that the input dataset includes multi-component seismic data.

In some embodiments, an aspect of the invention includes that the input dataset includes single component seismic data.

Thus, the computing systems and methods disclosed herein are more effective methods for processing collected data that corresponds to a subsurface region. These computing systems and methods increase data processing effectiveness, efficiency, and accuracy. Such methods and computing systems may complement or replace conventional methods for processing collected data that corresponds to a subsurface region.

BRIEF DESCRIPTION OF THE DRAWINGS

For a better understanding of the aforementioned embodiments as well as additional embodiments thereof, reference should be made to the Description of Embodiments below, in conjunction with the following drawings in which like reference numerals refer to corresponding parts throughout the figures.

FIG. 2 illustrates a marine-based seismic data acquisition system in accordance with some embodiments.

FIGS. 3 through 6 are flow diagrams illustrating methods of processing collected data in accordance with some embodiments.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Figure 1:
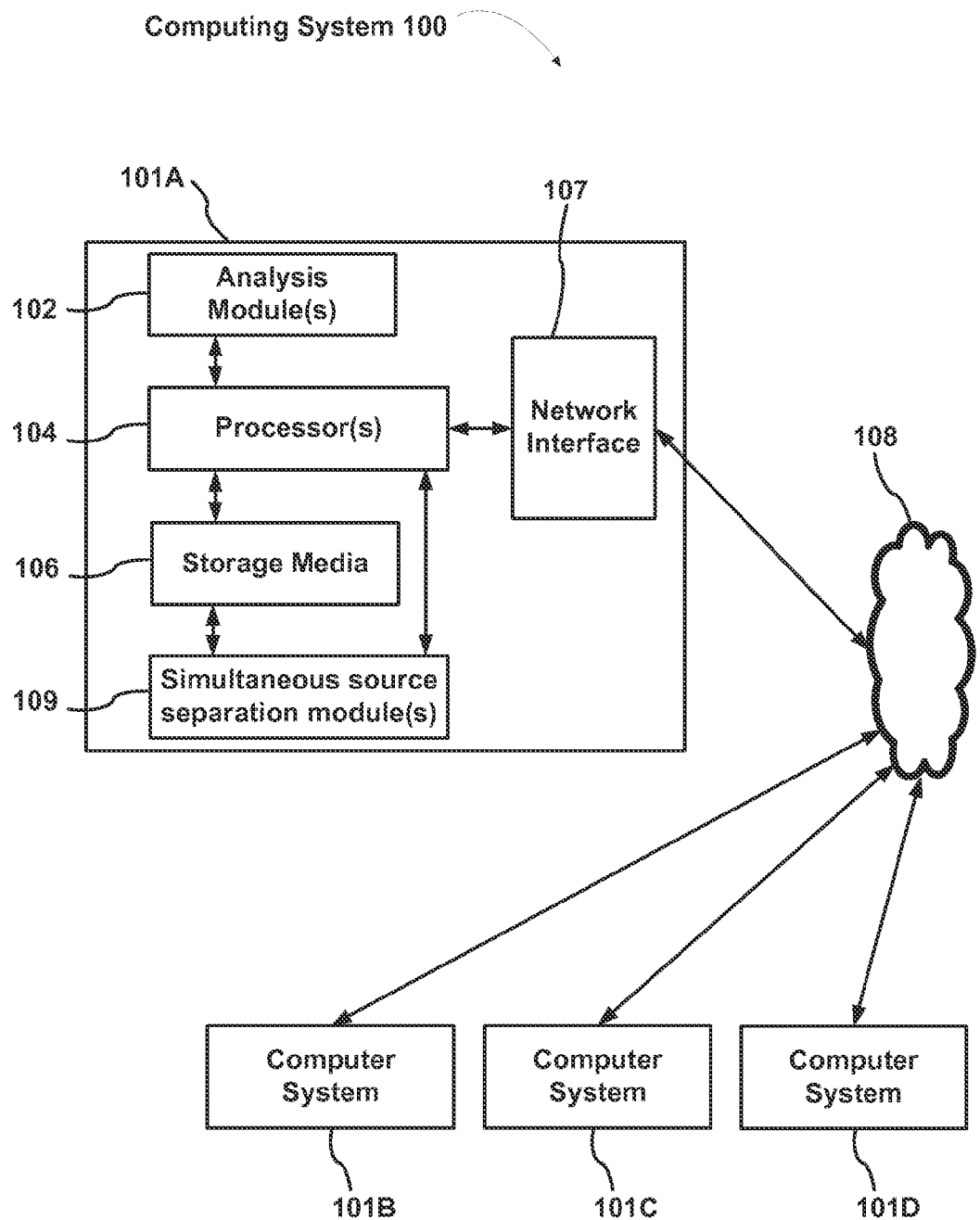
FIG. 1 illustrates a computing system in accordance with some embodiments.

FIG. 1 depicts an example computing system 100A in accordance with some embodiments. The computing system 100A can be an individual computer system 101A or an arrangement of distributed computer systems. The computer system 101A includes one or more analysis modules 102 that are configured to perform various tasks according to some embodiments, such as one or more methods disclosed herein (e.g., methods 110, 400, 500, and 600, and/or combinations and/or variations thereof). To perform these various tasks, analysis module 102 executes independently, or in coordination with, one or more processors 104, which is (or are) connected to one or more storage media 106A. The processor(s) 104 is (or are) also connected to a network interface 107 to allow the computer system 101A to communicate over a data network 108 with one or more additional computer systems and/or computing systems, such as 101B, 101C, and/or 101D (note that computer systems 101B, 101C and/or 101D may or may not share the same architecture as computer system 101A, and may be located in different physical locations, e.g., computer systems 101A and 101B may be on a ship underway on the ocean, while in communication with one or more computer systems such as 101C and/or 101D that are located in one or more data centers on shore, other ships, and/or located in varying countries on different continents).

A processor can include a microprocessor, microcontroller, processor module or subsystem, programmable integrated circuit, programmable gate array, or another control or computing device.

The storage media 106A can be implemented as one or more computer-readable or machine-readable storage media. Note that while in the example embodiment of FIG. 1 storage media 106A is depicted as within computer system 101A, in some embodiments, storage media 106A may be distributed within and/or across multiple internal and/or external enclosures of computing system 101A and/or additional computing systems. Storage media 106A may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), BluRays, or other types of optical storage; or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 100 contains one or more simultaneous-source separation module(s). In the example of computing system 100, computer system 101A includes simultaneous-source separation module 109. In some embodiments, a single simultaneous-source separation module may be used to perform some or all aspects of methods 110, 400, 500 and 600. In alternate embodiments, a plurality of simultaneous-source separation modules may be used to perform some or all aspects of methods 110, 400, 500, and 600.

It should be appreciated that computing system 100A is only one example of a computing system, and that computing system 100A may have more or fewer components than shown, may combine additional components not depicted in the example embodiment of FIG. 1, and/or computing system 100A may have a different configuration or arrangement of the components depicted in FIG. 1. The various components shown in FIG. 1 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Attention is now directed to processing procedures, methods, techniques and workflows that are in accordance with some embodiments. Some operations in the processing procedures, methods, techniques and workflows disclosed herein may be combined and/or the order of some operations may be changed.

FIG. 2 depicts a marine-based seismic data acquisition system 10 in accordance with some embodiments. In the system 10, a survey vessel 20 tows one or more seismic streamers 30 (one example streamer 30 being depicted in FIG. 2) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread. In another non-limiting example, a plurality of streamers may be towed as an array, wherein the array is towed at variable depths along the length of the streamer array. In another non-limiting example, a plurality of streamers may be towed as an array, wherein receivers on cables in the streamer array are deployed at variable depths along the streamer cable (i.e., the X-direction) and cables in the streamer array are deployed at variable depths in the cross-line direction (i.e., the Y-direction).

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensors 58, which may be, depending on the particular embodiment of the invention, hydrophones (as one non-limiting example) to acquire pressure data or multi-component sensors. For embodiments of the invention in which the sensors 58 are multi-component sensors (as another non-limiting example), each sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the sensor. It is noted that the multi-component seismic sensor may be implemented as a single device (as depicted in FIG. 2) or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure gradient of the pressure wavefield with respect to the inline direction.

The marine seismic data acquisition system 10 includes one or more seismic sources 40 (two example seismic sources 40 being depicted in FIG. 2), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an example acoustic signal 42 being depicted in FIG. 2), often referred to as "shots," are produced by the seismic sources 40 and are directed down through a water column 44 into strata 62 and 68 beneath a water bottom surface 24. The acoustic signals 42 are reflected from the various subterranean geological formations, such as an example formation 65 that is depicted in FIG. 2.

The incident acoustic signals 42 that are generated by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor 58 may provide a trace, which corresponds to a measure of a pressure wavefield by its hydrophone; and the sensor 58 may provide (depending on the particular embodiment of the invention) one or more traces that correspond to one or more components of particle motion.

The goal of the seismic acquisition is to build up an image of a survey area for purposes of identifying subterranean geological formations, such as the example geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as a seismic data processing system, which in some embodiments, may be a computing system such as that depicted in FIG. 1 and is further described above) that may be, for example, located on land or on the vessel 20. Thus, many variations are possible and are within the scope of the appended claims.

A particular seismic source 40 may be formed from an array of seismic source elements (such as air guns, for example) that may be arranged in strings (gun strings, for example) of the array. Alternatively, a particular seismic source 40 may be formed from one or a predetermined number of air guns of an array, may be formed from multiple arrays, etc. Regardless of the particular composition of the seismic sources, the sources may be fired in a particular time sequence during the survey.

As described in more detail below, the seismic sources 40 may be fired in a sequence such that multiple seismic sources 40 may be fired simultaneously or near simultaneously in a short interval of time so that a composite energy signal that is sensed by the seismic sensors 58 contain energy from more than one seismic source 40. In other words, the seismic sources interfere with each other such that the composite energy signal is not easily separable into signals that are attributed to the specific sources. The data that is acquired by the seismic sensors 58 is separated, as described below, into datasets that are each associated with one of the seismic sources 40 so that each dataset indicates the component of the composite seismic energy signal that is attributable to the associated seismic source 40. In some embodiments, a dataset may include multi-component seismic data. In some embodiments, a dataset may include single component seismic data.

In a conventional towed marine survey, a delay is introduced between the firing of one seismic source and the firing of the next seismic source, and the delay is sufficient to permit the energy that is created by the firing of one seismic source to decay to an acceptable level before the energy that is associated with the next seismic source firing arrives. The use of such delays, however, imposes constraints on the rate at which the seismic data may be acquired. For a towed marine survey, these delays also imply a minimum inline shot interval because the minimum speed of the survey vessel is limited.

Thus, the use of simultaneously-fired or near-simultaneously-fired seismic sources in which signals from the sources interfere for at least part of each record, has benefits in terms of acquisition efficiency and inline source sampling. For this technique to be used in conjunction with conventional data processing methods, the acquired data should ideally be separated into the datasets that are each uniquely associated with one of the seismic sources.

One conventional technique for enabling the separation for interfering seismic sources makes use of relatively small delays (random delays, for example) between the firings of seismic sources (i.e., involves the use of source dithering). The resulting seismic traces are collected into a domain that includes many firings of each source. The traces are aligned such that time zero corresponds to the firing time for a specific source so that the signal acquired due to the specific seismic source appears coherent while the signal acquired due to the other seismic sources appear incoherent. The acquired signals are separated based on coherency.

It has been observed that the apparently incoherent signal may not be mathematically incoherent, because the time delays between seismic source firings that make the signal appear to be incoherent are known. Therefore, in accordance with some embodiments of the invention described herein, all of the energy that is acquired due to interfering seismic source firings is treated as a single composite energy signal; and linear operator transforms are used for purposes of decomposing the composite energy signal into signals that are each uniquely associated with a particular seismic source.

More specifically, FIG. 3 depicts method 110 that may be generally used for purposes of separating seismic sensor data that was acquired due to the firings of interfering seismic sources. Referring to FIG. 3, the method 110 includes obtaining (block 114) seismic data (referred to as a "seismic data vector d"), which includes traces that were acquired by the seismic sensors due to a plurality of firings of N (i.e., multiple) seismic sources. Thus, the seismic sources were fired simultaneously or in a near simultaneous manner such that energy from multiple firings is present in the seismic data vector d. Pursuant to block 118, models, which describe the geology that affects the source energy are associated with linear operators, which describe the physics of the source mechanisms, the wave propagation and the survey geometry. The seismic data vector d is characterized (block 122) as a function of the models and the linear operators. This function is then jointly inverted (block 126) for the models, which permits the seismic data vector d to be separated (block 130) into N seismic datasets d1 ... dN such that each dataset is uniquely attributable to one of the seismic sources. In other words each dataset represents a component of the sensed composite energy signal, which is uniquely attributable to one of the seismic sources.

The term "shot" is used in a variety of contexts in this application, and the following may aid in interpreting the usage. A shot may be a particular firing of a particular seismic source. A simultaneous-source shot includes interfering data from any other shot(s), which may or may not correspond to the same seismic source. A separated shot does not include interfering data from other shots. As those with skill in the art will appreciate, however, reference to a separated shot does not mean that the shot is completely devoid of interfering data from other all other shots. Rather, in practice, a separated shot approximates a shot that does not include interfering data from other shots; varying amounts of interfering shot data may still remain after separation. Finally, it should be appreciated that while simultaneous-source shots may contain varying amounts of interference from other shots, some simultaneous-source shots may nevertheless be free of interfering shot data. Regardless, the terms discussed in the foregoing should be interpreted in the context in which they are used in this application, from the view of a person having ordinary skill in the art.

Attention is now directed to processing procedures, methods, techniques and workflows in accordance with some embodiments that include iterative separation of collected data, including simultaneous-source acquired data.

Figure 4:
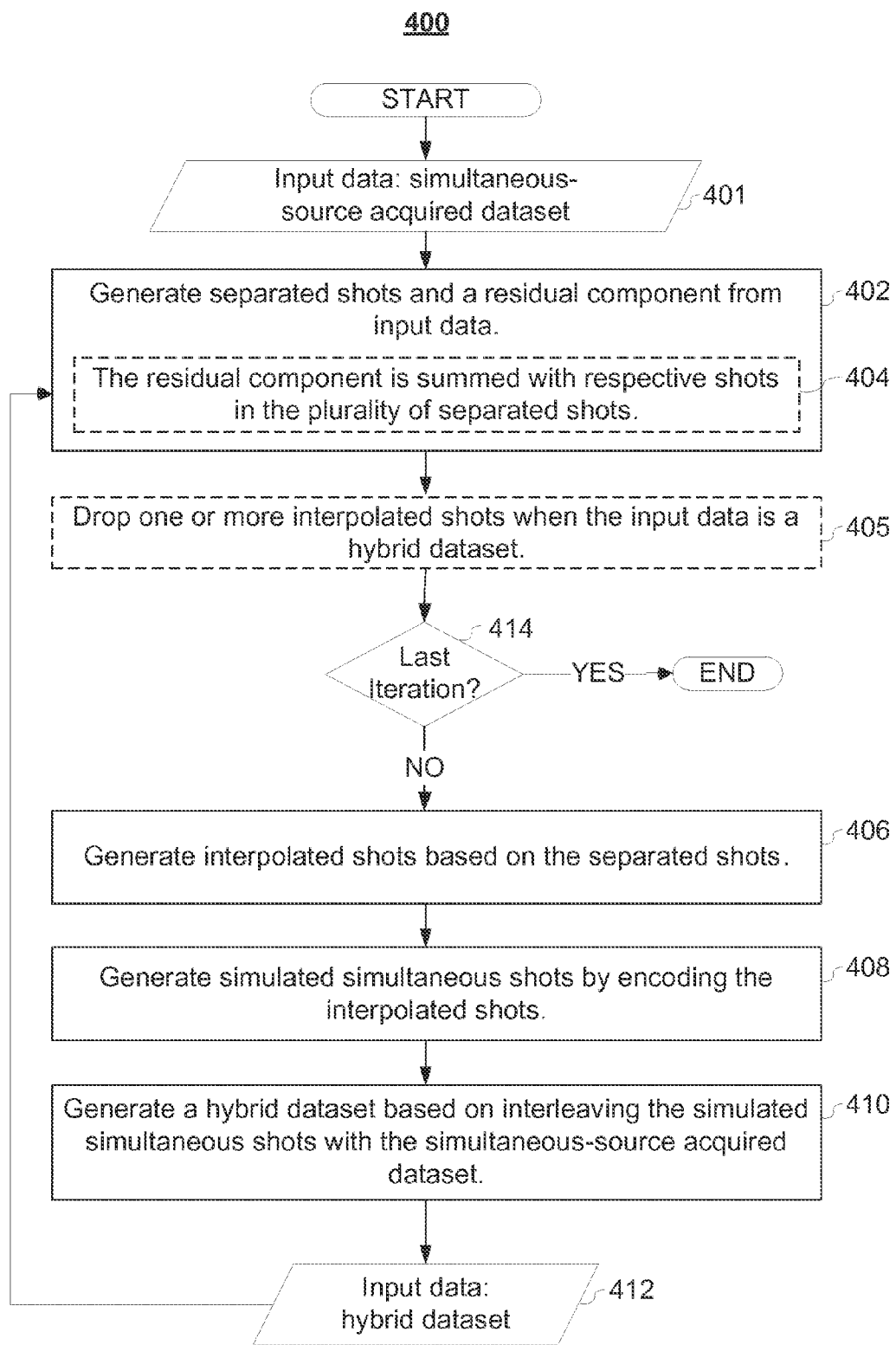

For a first iteration of method 400, which is illustrated in FIG. 4, an initial set of input data is simultaneous-source acquired dataset 401. In some embodiments, simultaneous-source acquired dataset 401 includes multi-component seismic data. The method then generates (402) a plurality of separated shots and a residual component from the input data (i.e., energy corresponding to distinct shots are separated so that different shots that previously interfered on a single trace are separated into distinct traces). In embodiments where the simultaneous-source acquired dataset 401 includes multi-component seismic data, the generation of separated shots is based at least in part on the multi-component seismic data.

In some embodiments, the generation of separated shots is based on using random noise attenuation to separate shots in the input dataset; in some embodiments, the generation of separated shots is based on using sparse inversion to separate shots in the input dataset (see, e.g., U.S. Patent App. Pub. No. 2009/0168600, entitled Separating seismic signals produced by interfering seismic sources, a copy of which is hereby incorporated by reference); those with skill in the art, however, will recognize that any suitable shot separation technique may be successfully employed.

In some embodiments, the technique of generating separated shots is parameterized according to properties of the input data to limit or reduce leakage of desired signal in the separation process. The input data may include a number of properties, such as a Shot Point Interval (or SPI), which has a relationship to an interpolation factor N. Varying the interpolation factor N can alter the SPI for subsequent iterations of method 400. In some embodiments, the interpolation factor N may be predefined for a plurality of iterations of method 400. In other embodiments, the interpolation factor N may be varied from iteration to iteration to improve anti-leakage performance. In some embodiments, an interpolation factor N is based on whole-numbers such as 2:1, 3:1, 4:1, etc., may be used. In some embodiments, an interpolation factor N is used that enables common offset gathers to be unaliased. Skilled artisans will recognize that other values may be employed successfully for an interpolation factor that will result in a desired SPI.

In some embodiments, leakage may also be reduced by limiting a frequency bandwidth that is separated.

In some embodiments, the residual component is added or summed with respective shots in the plurality of separated shots (404).

In some embodiments, method 400 also includes dropping or rejecting (405) one or more interpolated shots from the input data when the input data is a hybrid dataset.

Method 400 includes generating (406) a plurality of interpolated shots that are based on the separated shots. In some embodiments, the generation of interpolated shots is done on a N:1 basis (i.e., interpolating N−1 shots between a pair of recorded shots so that the total number of shots increases by a factor of N). For example in a N:1 interpolation where N=3 and there is a SPI of the recorded data that is 37.5 meters, then two interpolated shots would be generated between a pair of recorded (or input) shots; this would result in a SPI of 12.5 meters following the generation of the interpolated shots.

In some embodiments, the interpolation is performed such that interpolation of shots into the dataset is done independently for each of N sources, e.g., interpolation of shots for a first source is independent of interpolation for a second source.

In some embodiments, the interpolation uses an interpolation factor above a predetermined threshold that results in the interpolated data being unaliased in the domain used for separation, but can vary from iteration to iteration.

In embodiments where the simultaneous-source acquired dataset 401 includes multi-component seismic data, the generation of interpolated shots is based at least in part on the multi-component seismic data.

Method 400 includes generating (408) a plurality of simulated simultaneous shots by encoding the plurality of interpolated shots. For example, a plurality of single source interpolated shots corresponding to different sources may be combined into a single simulated simultaneous shot that can be interleaved in between actually acquired shots in the dataset.

As a non-limiting example of creating a simulated simultaneous shot in accordance with some embodiments, consider recorded dataset Y that includes recorded shots A and B, each of which contain contributions from two sources, S1 and S2. After separating recorded shots A and B, the results are separated shot A that is equal to A1+A2+Ar, where A1 is the estimated contribution to recorded shot A from source S1, A2 is the estimated contribution to recorded shot A from source S2, and Ar is the residual; separated shot B is analogous to the aforementioned case of separated shot A. In some circumstances, the residual may be added back to estimated contributions, e.g., then the separated shot data can be AF=A1+Ar, A2'=A2+Ar, etc. In this example, if one performs N:1 interpolation where N=2, interpolated shots C1 and C2 are generated half-way between recorded shots A and B. Finally, the generation of a simulated separated shot C involves combining C1 and C2 by encoding and summing.

In some embodiments, encoding the interpolated shots involves the use of the same encoding scheme as used for the simultaneous-source acquired data. As a non-limiting example, for data acquired using timing dithers, the encoding scheme for the interpolated shots includes generating new dithers for those shots, applying time-shifts to each shot equal (or substantially equal) to the dither, and summing the shots.

In some embodiments, encoding the interpolated shots uses an encoding scheme which is different from the encoding scheme used during acquisition of the simultaneous-source acquired data. In some embodiments, encoding the interpolated shots uses an encoding scheme that is an extension of the encoding scheme used during acquisition of the simultaneous-source acquired data (i.e., an extended encoding scheme). In some embodiments, the encoding scheme may be an encoding scheme which is not practical during acquisition. Some non-limiting examples include: the interpolated data may be encoded using amplitude dithers, as well as, or in place of, timing dithers; the interpolated data may be encoded by incorporating time, phase or amplitude variations. In some embodiments, the amplitude can be set to zero for one or more sources, simulating a dataset in which those sources did not fire at the interpolated shot location. The additional encoding scheme becomes a property of the input dataset for subsequent iterations, and can be used by the separation algorithm at 402.

In some embodiments, the encoding scheme changes from iteration to iteration. In some embodiments, the encoding scheme changes from receiver to receiver.

In some embodiments, a plurality of simulated separated shots are created at an interpolated shot location using varying encoding schemes for respective shots in the plurality of simulated separated shots.

In one embodiment, an interpolated shot can be generated for each source separately to reduce aliasing effects for each source.

Method 400 includes generating (410) a hybrid dataset based on interleaving the simulated separated shots with the simultaneous-source acquired dataset. Returning to the non-limiting example of the previous paragraph, a hybrid dataset can be generated by interleaving simulated separated shot C between recorded shots A and B. This results in a single hybrid dataset Z, i.e., simulated shot A, simulated separated shot C, and recorded shot B, where the SPI of hybrid dataset Z is half that of the SPI of recorded dataset Y. The hybrid dataset is a new input dataset 412 that may be used as input to the next iteration of method 400.

As noted above, properties of the hybrid dataset may be used to reduce leakage, and in some embodiments, a revised interpolation factor N may be used in a subsequent iteration of method 400, e.g., properties may be adjusted based on changing an interploation factor N for the next iteration of the method.

After one or more separation operations (i.e., generation of separated shots 402 on the simultaneous-source acquired dataset and/or one or more iterations of separation on hybrid datasets), a decision is made (414) on whether method 400 should be run again to further refine the dataset. If the answer is that the last iteration has been performed, the method ends. If the answer is that the last iteration has not been performed, method 400 continues again with generation of interpolated shots (406).

Figure 5B:
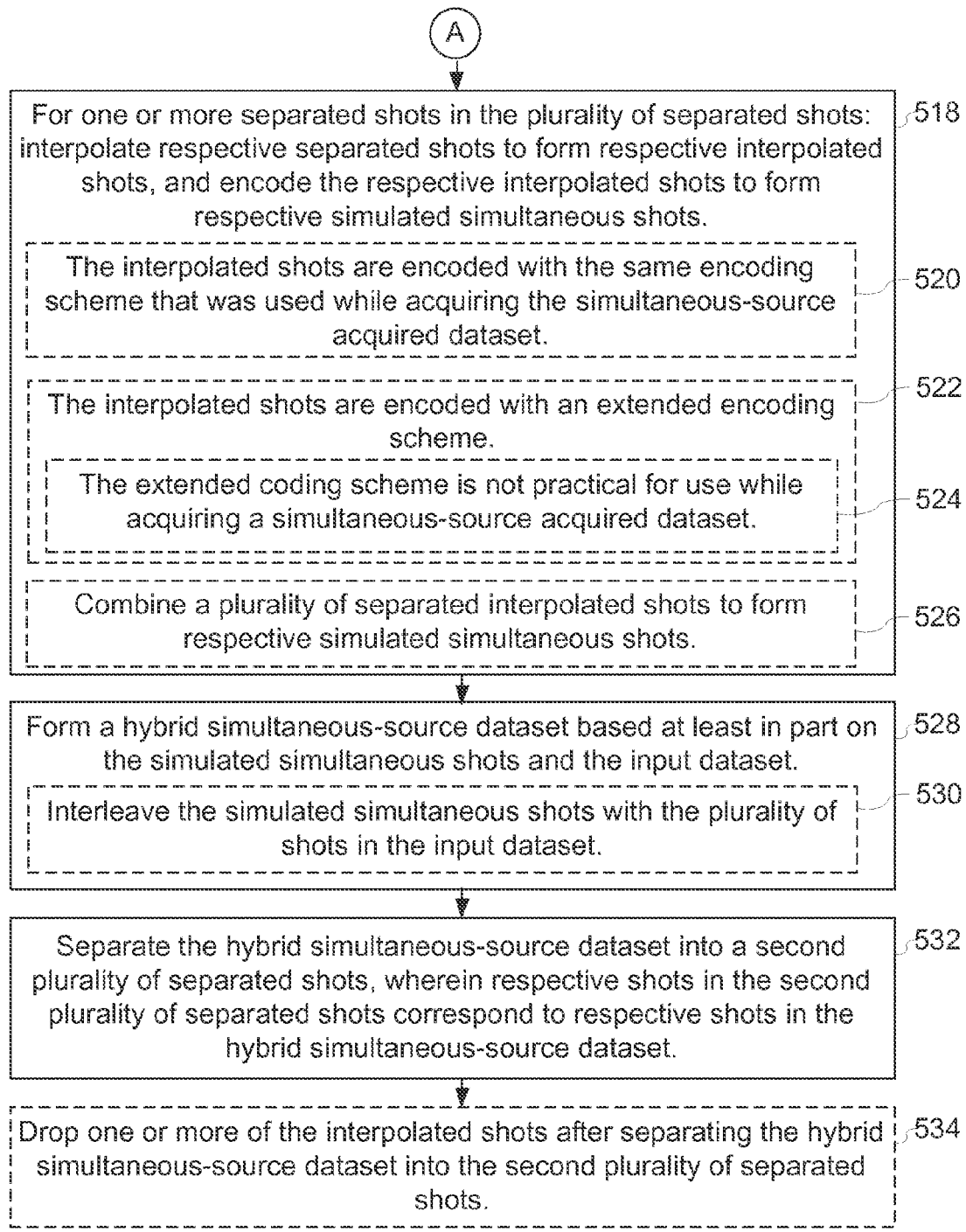

Attention is now directed to FIGS. 5A and 5B, which are flow diagrams illustrating method 500 for processing collected data in accordance with some embodiments. Some operations in method 500 may be combined and/or the order of some operations may be changed. Further, some operations in method 500 may be combined with aspects of the example workflows of FIGS. 3, 4 and/or 6, and/or the order of some operations in method 500 may be changed to account for incorporation of aspects of the workflow illustrated by FIGS. 3, 4 and/or 6.

It is important to recognize that geologic interpretations, models and/or other interpretation aids may be refined in an iterative fashion; this concept is applicable to methods 110, 400, 500, and 600 as discussed herein. This can include use of feedback loops executed on an algorithmic basis, such as at a computing device (e.g., computing system 100, FIG. 1), and/or through manual control by a user who may make determinations regarding whether a given step, action, template, model, or set of curves has become sufficiently accurate for the evaluation of the subsurface three-dimensional geologic formation under consideration.

Method 500 includes receiving (502) an input dataset that corresponds at least in part to a subsurface three-dimensional geologic formation, wherein the input dataset is a simultaneous-source acquired dataset that includes a plurality of shots, and one or more shots in the plurality of shots includes data corresponding to a plurality of source activations (e.g., FIG. 4, 401, input data: simultaneous-source acquired dataset received at computing system 100 in FIG. 1). In some embodiments, the input dataset includes multi-component seismic data. In some embodiments, the input dataset includes single component seismic data.

In some embodiments, the plurality of source activations represented in the simultaneous-source acquired dataset includes a plurality of successive activations of a first source (504). In some embodiments, the plurality of source activations represented in the simultaneous-source acquired dataset includes one or more activations of respective sources in a plurality of sources (506).

Method 500 includes separating (508) the input dataset into a plurality of separated shots, wherein respective shots in the plurality of separated shots correspond to respective shots in the plurality of shots in the input dataset (e.g., FIG. 4, 402, generation of separated shots from the input data, which is the simultaneous-source acquired dataset 401).

In some embodiments, separating the input dataset into the plurality of separated shots further comprises determining a residual that is added to the plurality of separated shots (510) (e.g., FIG. 4, 402, generation of residual as well as separated shots from the input data).

In some embodiments, separating the input dataset into the plurality of separated shots further comprises parameterizing the input dataset to reduce leakage. (512)

In some embodiments, separating the input dataset into the plurality of separated shots is performed by sparse inversion. (514)

In some embodiments, separating the input dataset into the plurality of separated shots is performed by random noise attenuation. (516)

Method 500 then performs additional processing for one or more separated shots in the plurality of separated shots, where the additional processing includes: interpolating respective separated shots to form respective interpolated shots, and then encoding the respective interpolated shots to form respective simulated simultaneous shots (518) (e.g., FIG. 4, 406, generation of interpolated shots, and 408, generation of simulated simultaneous shots).

In some embodiments, the interpolated shots are encoded with the same encoding scheme that was used while acquiring the simultaneous-source acquired dataset. (520)

In some embodiments, the interpolated shots are encoded with an extended encoding scheme. (522)

In some embodiments, the extended coding scheme is not practical for use while acquiring a simultaneous-source acquired dataset. (524)

In some embodiments, respective simulated simultaneous shots are formed by combining a plurality of separated interpolated shots. (526)

Method 500 includes forming (528) a hybrid simultaneous-source dataset based at least in part on the simulated simultaneous shots and the input dataset (e.g., FIG. 4, 410, generation of a hybrid dataset based on the simulated simultaneous shots and the simultaneous-source acquired dataset).

In some embodiments, forming the hybrid simultaneous-source dataset includes interleaving the simulated simultaneous shots with the plurality of shots in the input dataset (530) (e.g., FIG. 4, 410, generation of a hybrid dataset based on interleaving the simulated simultaneous shots with the simultaneous-source acquired dataset).

Method 500 includes separating (532) the hybrid simultaneous-source dataset into a second plurality of separated shots, wherein respective shots in the second plurality of separated shots correspond to respective shots in the hybrid simultaneous-source dataset (e.g., FIG. 4, 402, generation of separated shots from the input data, which is the hybrid dataset 412).

In some embodiments, method 500 also includes dropping one or more of the interpolated shots after separating the hybrid simultaneous-source dataset into the second plurality of separated shots (534) (e.g., FIG. 4, 405, dropping one or more interpolated shots).

Attention is now directed to FIG. 6, which is a flow diagram illustrating method 600 for processing collected data in accordance with some embodiments. Some operations in method 600 may be combined and/or the order of some operations may be changed. Further, some operations in method 600 may be combined with aspects of the example workflows of FIGS. 3, 4 and/or 5, and/or the order of some operations in method 600 may be changed to account for incorporation of aspects of the workflow illustrated by FIGS. 3, 4 and/or 5.

Method 600 is directed to separating a simultaneous-source dataset through a series of one or more iterations of the method. The simultaneous-source dataset corresponds at least in part to a subsurface three-dimensional geologic formation, and includes a plurality of shots where one or more shots in the plurality of shots includes data corresponding to a plurality of source activations. For the first iteration of simultaneous-source separation, the simultaneous-source dataset is used as the input dataset. Method 600 includes generating (602) a plurality of separated shots from the input dataset (e.g., FIG. 4, 402, generation of separated shots from the input data, which is the simultaneous-source acquired dataset 401).

In some embodiments, the simultaneous-source dataset includes multi-component seismic data. In some embodiments, the simultaneous-source dataset includes single component seismic data.

Method 600 includes generating (604) a plurality of simulated simultaneous shots based at least in part on the plurality of separated shots (e.g., FIG. 4, 408, generation of simulated simultaneous shots).

In some embodiments, the plurality of the simulated simultaneous shots is generated according to a first technique during a first iteration and according to a second technique during a second iteration. (606)

In some embodiments, generating the plurality of simulated simultaneous shots includes interpolating respective separated shots in the plurality of separated shots, and the interpolation is based at least in part on an interpolation factor (608) (e.g., FIG. 4, 406, generation of interpolated shots based on the separated shots). In some embodiments, the interpolation factor is altered between a first separation iteration and a second separation iteration. (610)

Method 600 includes forming (612) an output dataset based at least in part on the plurality of separated simultaneous shots and the simultaneous-source dataset, wherein the output dataset is configured for use as the input dataset for the next iteration of separating the simultaneous-source dataset (e.g., FIG. 4, 410, generation of a hybrid dataset based on the simulated simultaneous shots and the simultaneous-source acquired dataset, where the hybrid dataset 412 is used as input data for the next iteration of separation beginning again at 402).

In some embodiments, forming the output dataset includes interleaving the plurality of separated simulated shots with the simultaneous-source dataset (614) (e.g., FIG. 4, 410, generation of a hybrid dataset based on interleaving the simulated simultaneous shots with the simultaneous-source acquired dataset).

Some examples disclosed herein are directed to separation of shots from a plurality of interfering sources, e.g., a pair of sources are activated in a series of shots, and recorded traces capture energy from both sources but only from a single shot for each source (the sources interfere with each other, but not with themselves). Those with skill in the art, however, will appreciate that one or more sources can be activated sufficiently frequently that energy attributable to a given source activated at a first time interferes with capturing energy attributable to that same source activated at a second, later time. Accordingly, separating energies from one or more successive activations of a particular source is sometimes necessary as well, and the methods disclosed herein may be used for that purpose.

While certain implementations have been disclosed in the context of seismic data collection and processing, those with skill in the art will recognize that the disclosed methods can be applied in many fields and contexts where data involving structures arrayed in a three-dimensional space may be collected and processed, e.g., medical imaging techniques such as tomography, ultrasound, MRI and the like, SONAR and LIDAR imaging techniques and the like.

The steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
receiving an input dataset that comprises seismic data collected from a subsurface three-dimensional geologic formation, wherein:
the input dataset is a simultaneous-source acquired dataset that includes a plurality of shots, and
one or more shots in the plurality of shots includes data corresponding to a plurality of source activations;
separating the input dataset into a plurality of separated shots, wherein respective shots in the plurality of separated shots correspond to respective shots in the plurality of shots in the input dataset;
for one or more separated shots in the plurality of separated shots:
interpolating respective separated shots to form respective interpolated shots, and
encoding the respective interpolated shots to form respective simulated simultaneous shots;
forming a hybrid simultaneous-source dataset based at least in part on the simulated simultaneous shots and the input dataset; and
separating the hybrid simultaneous-source dataset into a second plurality of separated shots, wherein respective shots in the second plurality of separated shots correspond to respective shots in the hybrid simultaneous-source dataset.

2. The method of claim 1, further comprising dropping one or more of the interpolated shots after separating the hybrid simultaneous-source dataset into the second plurality of separated shots.

3. The method of claim 1, wherein forming the hybrid simultaneous-source dataset includes interleaving the simulated simultaneous shots with the plurality of shots in the input dataset.

4. The method of claim 1, wherein separating the input dataset into the plurality of separated shots further comprises determining a residual that is added to the plurality of separated shots.

5. The method of claim 1, wherein separating the input dataset into the plurality of separated shots further comprises parameterizing the input dataset to reduce leakage.

6. The method of claim 1, wherein separating the input dataset into the plurality of separated shots is performed by sparse inversion.

7. The method of claim 1, wherein separating the input dataset into the plurality of separated shots is performed by random noise attenuation.

8. The method of claim 1, wherein respective simulated simultaneous shots are formed by combining a plurality of separated interpolated shots.

9. The method of claim 1, wherein the plurality of source activations includes a plurality of successive activations of a first source.

10. The method of claim 1, wherein the plurality of source activations includes one or more activations of respective sources in a plurality of sources.

11. The method of claim 1, wherein the interpolated shots are encoded with the same encoding scheme that was used while acquiring the simultaneous-source acquired dataset.

12. The method of claim 1, wherein the interpolated shots are encoded with an extended encoding scheme.

13. The method of claim 12, wherein the extended coding scheme is not practical for use while acquiring a simultaneous-source acquired dataset.

14. A method, comprising:
receiving a simultaneous-source dataset that comprises seismic data collected from a subsurface three-dimensional geologic formation;
iteratively separating the simultaneous-source dataset that is used as an input dataset for a first iteration of simultaneous-source separation, wherein the simultaneous-source dataset:
includes a plurality of shots, wherein one or more shots in the plurality of shots includes data corresponding to a plurality of source activations; and
the method of iteratively separating the input dataset includes:
generating a plurality of separated shots from the input dataset;
generating a plurality of simulated simultaneous shots based at least in part on the plurality of separated shots; and
forming an output dataset based at least in part on the plurality of simulated simultaneous shots and the simultaneous-source dataset, wherein forming the output dataset includes interleaving the plurality of simulated simultaneous shots with the simultaneous-source dataset and wherein the output dataset is configured for use as the input dataset for the next iteration of separating the simultaneous-source dataset.

15. The method of claim 14, wherein the plurality of the separated shots is generated according to a first technique during a first iteration and according to a second technique during a second iteration.

16. The method of claim 14, wherein the plurality of the simulated simultaneous shots is generated according to a first technique during a first iteration and according to a second technique during a second iteration.

17. The method of claim 14, wherein generating the plurality of simulated simultaneous shots includes interpolating respective separated shots in the plurality of separated shots, and the interpolation is based at least in part on an interpolation factor.

18. The method of claim 17, wherein the interpolation factor is altered between a first separation iteration and a second separation iteration.

19. A computing system, comprising:
one or more processors,
at least one memory, and
one or more programs stored in the at least one memory, wherein the one or more programs are configured to be executed by the one or more processors, the one or more programs including instructions for:
  receiving an input dataset that comprises seismic data collected from a subsurface three-dimensional geologic formation, wherein:
    the input dataset is a simultaneous-source acquired dataset that includes a plurality of shots, and
    one or more shots in the plurality of shots includes data corresponding to a plurality of source activations;
  separating the input dataset into a plurality of separated shots, wherein respective shots in the plurality of separated shots correspond to respective shots in the plurality of shots in the input dataset;
  for one or more separated shots in the plurality of separated shots:
    interpolating respective separated shots to form respective interpolated shots, and
    encoding the respective interpolated shots to form respective simulated simultaneous shots;
  forming a hybrid simultaneous-source dataset based at least in part on the simulated simultaneous shots and the input dataset; and
  separating the hybrid simultaneous-source dataset into a second plurality of separated shots, wherein respective shots in the second plurality of separated shots correspond to respective shots in the hybrid simultaneous-source dataset.

20. The computing system of claim 19, wherein the input dataset includes multicomponent seismic data.

* * * * *